United States Patent [19]
Liu et al.

[11] Patent Number: 5,510,914
[45] Date of Patent: Apr. 23, 1996

[54] SMECTIC LIQUID CRYSTAL ANALOG PHASE MODULATOR

[75] Inventors: Jian-Yu Liu, Boulder; Kristina M. Johnson, Longmont, both of Colo.

[73] Assignee: The Regents of the University of Colorado, Boulder, Colo.

[21] Appl. No.: 153,079

[22] Filed: Nov. 15, 1993

[51] Int. Cl.$^6$ ............... G02F 1/1343; G02F 1/13; G02F 1/03; G02F 1/01

[52] U.S. Cl. ............... 359/56; 359/100; 359/260; 359/279

[58] Field of Search ............... 359/56, 93, 100, 359/260, 71, 73, 87, 279

[56] References Cited

U.S. PATENT DOCUMENTS

| | | | |
|---|---|---|---|
| 4,367,924 | 1/1983 | Clark et al. | 350/334 |
| 4,848,663 | 6/1989 | Lagerwall et al. | 350/350 S |
| 5,078,477 | 1/1992 | Jono et al. | 359/91 |
| 5,150,236 | 9/1992 | Patel | 359/71 |
| 5,151,804 | 9/1992 | Verhulst et al. | 359/56 |
| 5,223,963 | 6/1993 | Okada et al. | 359/78 |
| 5,377,026 | 12/1994 | Liu et al. | 359/56 |
| 5,381,253 | 1/1995 | Sharp et al. | 359/53 |

OTHER PUBLICATIONS

Maclennan, J. E. et al., "Director reorientation dynamics in chevron ferroelectric liquid crystal cells," (1990) Liquid Crystals 7(6):787–796.

Maclennan, J. E., et al., "Director orientation in chevron surface-stabilized ferroelectric liquid crystal cells: Verification of orientational binding at the chevron interface using visible polarized light transmission spectroscopy," (1990) Liquid crystals 7(6):753–785.

Elston, S. J. and Sambles, J. R., "The Observation of Half Splayed States in Ferroelectric Liquid Crystal Filled Cells by the Excitation of Optic Modes", Jpn J. Applied Physics (1990) 29(4):L641–L644.

Kondo and Akahane, "Chevron Layer Structure and Focal Conics in Chiral Smectic C Liquid–Crystal Cells Aligned by SiO Oblique Evaporation Technique", Jpn. J. Applied Physics (1991) 30(9B) L1659–L1661.

Liu et al., "Room temperature 10 MHz electro-optic modulation in ferroelectrc liquid crystals", Appl. Phys. Lett. (1993) 62(9):934–936.

Liu, Jian-Yu, "Second-order Nonlinearities in Ferroelectric Liquid Crystal Materials," Ph.D. Thesis submitted to Faculty of Graduate School of Univ. of Colorado, 1992, pp. 129–138.

Willis, "X-ray and Optical Studies of Electric Field Induced Layer Structure Changes in SSFLC Cells", Ph.D. Thesis submitted to Faculty of Graduate School of Univ. of Colorado (1992) pp. 10–26.

Yamada, Y. et al., "Investigation of Switching Behavior in a Ferroelectric Liquid Crystal Aligned on Obliquely Deposited SiO Films", Jpn. J. of Applied Physics (1989) 28(1):50–55.

*Primary Examiner*—Anita Pellman Gross
*Assistant Examiner*—Walter J. Malinowski
*Attorney, Agent, or Firm*—Greenlee and Winner

[57] ABSTRACT

This invention provides analog phase modulators comprising smetic liquid crystal cells wherein the layers are specifically not aligned perpendicular to the cell walls. The layers are either tilted with respect to the substrate or are in a chevron structure. Application of an analog electric field perpendicular to the cell walls bends the molecules in an analog fashion in a plane not parallel to the cell walls and thereby provides analog phase modulation of incident light. Analog phase modulation can not be directly provided by the surface-stabilized smectic liquid crystal cells known in the art, nor can analog tilting of SmC* liquid crystals be achieved. This invention further provides Fabry-Perot devices containing these analog phase modulators within the resonance cavity. The filter of this invention is optimally suited for wavelength-division multiplexing in photonic networks. It has high throughput, large tuning range, high resolution, and high modulation speed. The filter requires only small applied electric fields and has a very simple and inexpensive processing procedure.

44 Claims, 5 Drawing Sheets

SMECTIC LIQUID CRYSTAL ANALOG PHASE MODULATOR

This invention was made with Government support under contract ECF-9015128 awarded by the National Science Foundation. The Government has certain rights to this invention.

FIELD OF THE INVENTION

This invention relates to analog phase modulation by smectic liquid crystal cells with a chevron or tilted layer alignment and to Fabry-Perot modulators containing such cells.

BACKGROUND OF THE INVENTION

The use of optical fibers in telecommunication networks is gaining favor as a method for increasing the capacity, and providing longer communication links and system economy for the network. Since the bandwidth, or the information carrying capacity of optical fiber, is about 200 nm (25 THz) at 1550 nm, wavelength-division multiplexing can fit 256, 0.8 nm channels within this bandwidth. To take advantage of this fiber capacity, there is a need for an inexpensive, high speed, wide range tunable optical filter.

Several optical tunable filters are now available in the commercial market or are under extensive research. Several are based on Fabry-Perot (FP) resonance cavities. A Fabry-Perot filter is simply a cavity enclosed between two mirrors. The wavelength selected (the resonant peak) depends on the optical path length between the two mirrors. The filter can be tuned either by changing the cavity length mechanically or by changing the refractive index of the material inside the cavity. Mechanical modulation of the cavity length generally is achieved by applying a voltage to the piezoelectric material, which typically has a milliseconds response time. Refractive index modulation of the material within the cavity also has been achieved using nematic liquid crystals. However, the response time is still limited to milliseconds.

In our previous high speed tunable filter work (Johnson et al., U.S. patent application Ser. No. 08/056,415, filed May 3, 1993), homeotropically or tilted layer aligned SmA* liquid crystalline material with lateral electrodes is used within a Fabry-Perot cavity. In the homeotropic alignment the layers are parallel to the cell walls and in the tilted alignment they are at an angle to the walls. Application of an electric field parallel to the cell walls by lateral electrodes rotates the molecular directors in a plane containing the polarization vector of the incident optical field, thereby tuning the material birefringence and modulating the phase of the incident light. Within a Fabry-Perot cavity the phase modulation produces wavelength tuning.

Surface-stabilized planar aligned smectic liquid crystals are increasingly finding application, offering microsecond switching times and either analog (SmA*) or discrete (SmC* and antiferroelectric) switching. Due to their planar alignment with respect to glass restraining substrates smectic layers perpendicular to cell walls, the molecules rotate in a plane perpendicular to the direction of propagation of light through the device and do not provide variable phase modulation. Rotation of the molecules (SmC* or SmA*) in the plane of the substrate can provide a modulation of the intensity of an incident optical field when viewed through crossed polarizers, but can not provide variable retardation. However, in a Fabry-Perot resonator, it is necessary to modulate the phase of the incident optical field to tune the wavelength of maximum transmission of the FP device.

Chiral smectic C* liquid crystals have microsecond response due to their first order coupling between their macroscopic polarization and an applied electric field. In the planar (bookshelf) alignment, as positive and negative electric fields are applied to the cells, the molecules switch between a first and a second stable state, both of which have molecular directors in a plane parallel to the cell walls. It is widely accepted that chiral smectic C* liquid crystals are binary and are incapable of providing analog modulation.

In surface stabilized ferroelectric liquid crystals (SSFLC), such as the SmC* phase, it has been found that the smectic layers are not necessarily perpendicular to the cell walls but may have tilted layers or may contain chevron defects. In the chevron structure the layers lean at an angle to the cell wall and have an interface at which the leaning direction is reversed. Considerable effort has been spent finding materials which are not prone to chevron defects and finding alignment techniques which suppress the chevron structure. Typically the cell thickness is set below 2 μm so that the surface stabilization persists throughout the liquid crystal structure.

SUMMARY OF THE INVENTION

This invention provides analog phase modulators comprising SmC* liquid crystal cells wherein the layers are specifically not aligned perpendicular to the cell walls. The layers are either tilted with respect to the substrate or are in a chevron structure. Application of an analog electric field perpendicular to the cell walls bends the molecules in an analog fashion in a plane not parallel to the cell walls and thereby provides analog phase modulation of incident light. Analog phase modulation can not be directly provided by the surface-stabilized smectic liquid crystal cells known in the art, nor can analog tilting of SmC* liquid crystals be achieved.

This invention further provides Fabry-Perot devices containing these analog phase modulators within the resonance cavity. The filter of this invention is optimally suited for wavelength-division multiplexing in photonic networks. It has high throughput, large tuning range, high resolution, and high modulation speed. The filter requires only small applied electric fields (a few V/μm) and has a very simple and inexpensive processing procedure.

Brief Description of the Drawings

FIG. 2 illustrates bookshelf surface-stabilized alignment (FIG. 2a), quasi-bookshelf alignment (FIG. 2b) and chevron alignment (FIG. 2c).

FIG. 7 is a liquid crystal polarization insensitive Fabry-Perot filter.

Detailed Description of the Invention

Figure 1:
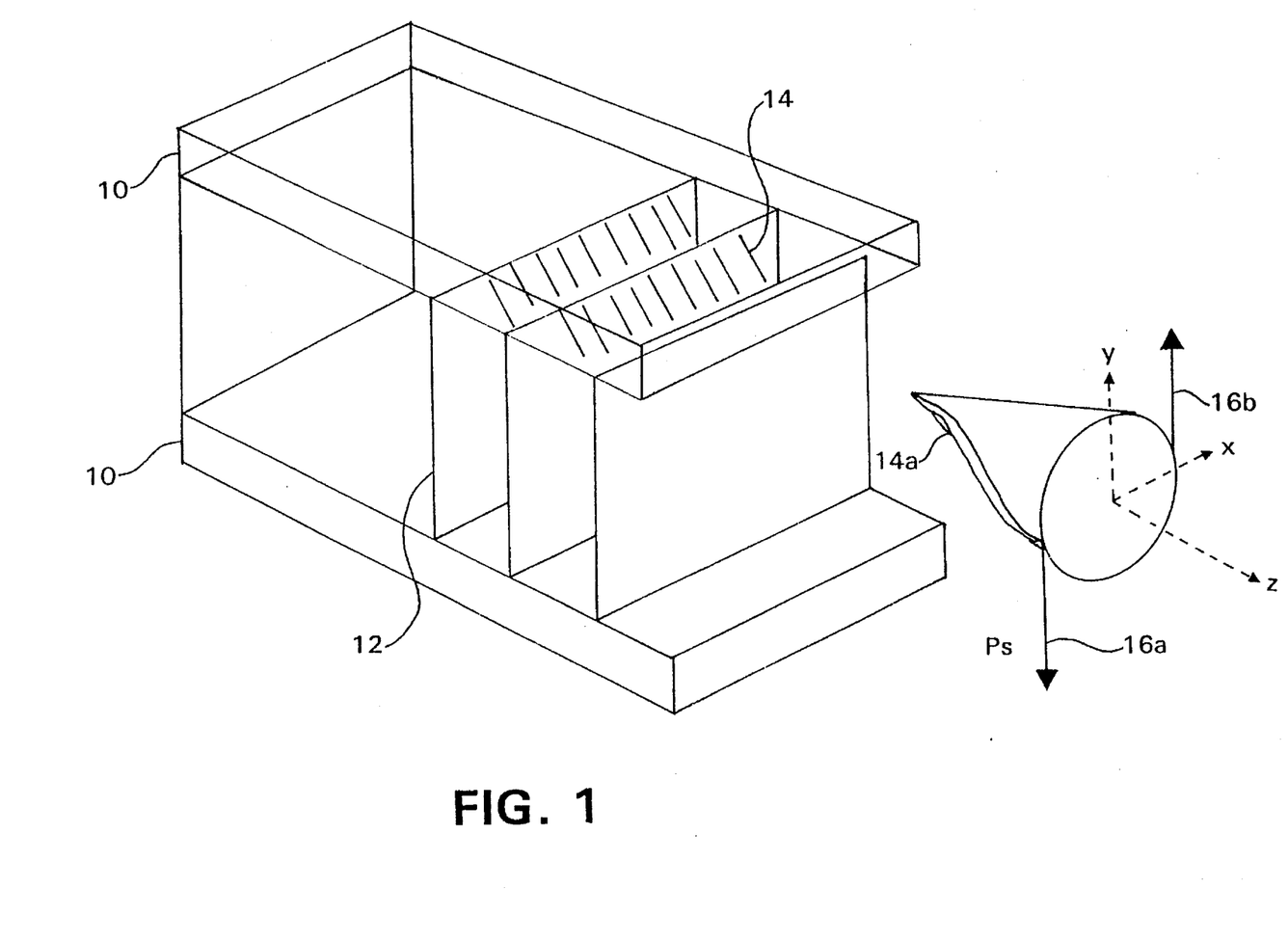
FIG. 1 illustrates binary modulation by a surface-stabilized SmC* cell.

In an ideal surface-stabilized ferroelectric liquid crystal bookshelf geometry (FIG. 1) liquid crystal molecules 14 are parallel to glass substrates 10. The molecules are in smectic layers 12 which are perpendicular to the substrate. As illustrated for molecule 14a, when an electric field is applied in the negative y-direction, the molecular director is in the xz plane on one side of a cone and the spontaneous polarization 16a is along the y-axis, parallel to the applied field. When the sign (polarity) of the E-field is reversed, the FLC molecules rotate to the other side of the cone but remain in the same xz plane. In the second position, the spontaneous polarization 16b is again aligned parallel to the applied field. The FLC molecules are bistable. With application of a threshold voltage of a first sign in the y-direction they orient in the first position, and on reversing the field they orient in the second position. The orientation does not change with the magnitude of the applied field above the threshold level, and the orientation remains stable on removal of the applied field. Because the molecular alignment is confined to the xz plane, the magnitude of the projection of the refractive index in the xz plane is unchanged. Thus, for light at normal incidence (propagation vector in the y-direction) having its polarization vector in the xz plane, planar-aligned cells are not variable phase retarders.

Figure 2A:
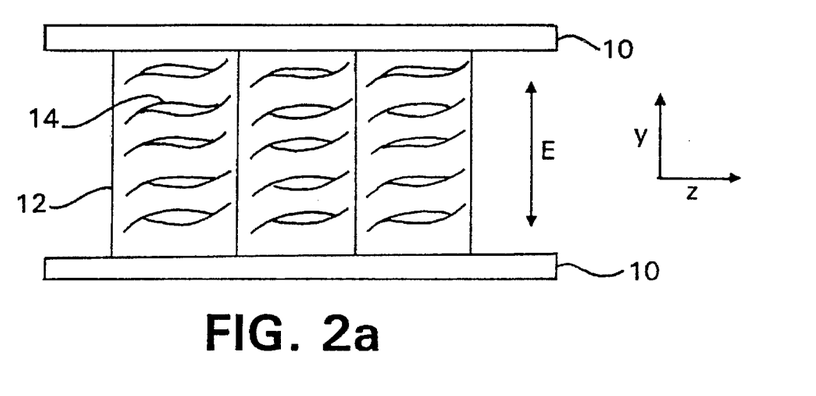

The bookshelf aligned cell is shown in side view in FIG. 2a. To switch the orientation of the molecules a positive or negative electric field is applied perpendicular to the substrates. The molecules reorient within the xz plane but their projection in the yz plane is unchanged.

Figure 2B:
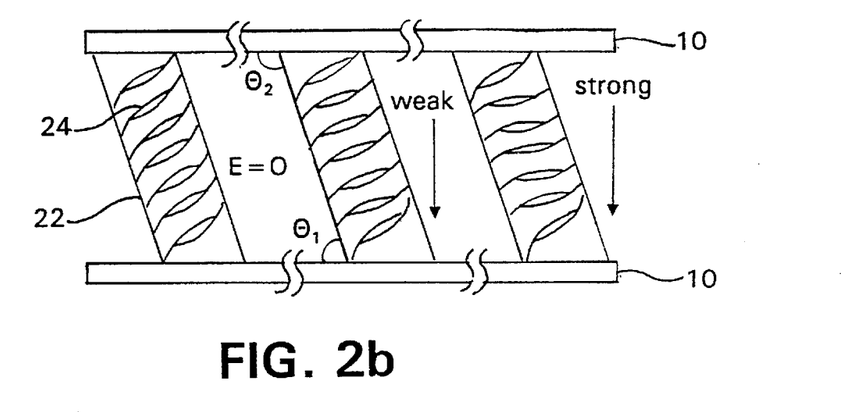
Figure 2C:
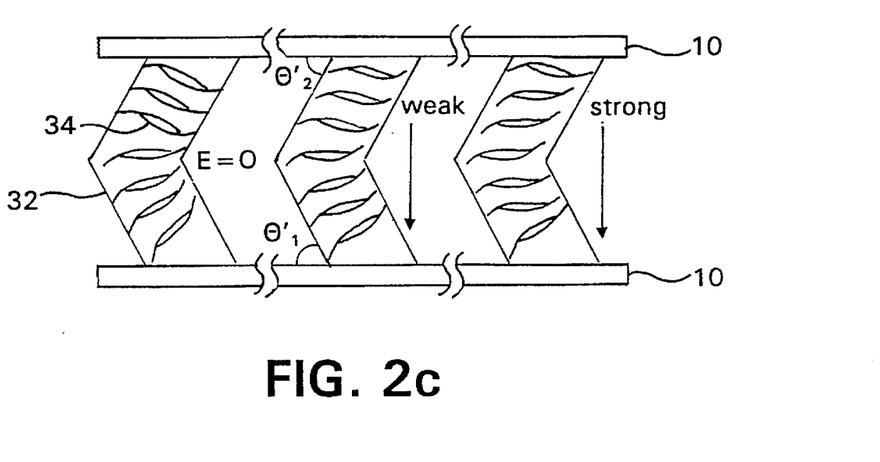

The alignments of the phase modulator of this invention are shown in FIGS. 2b and 2c. In the quasi-brookshelf alighment (FIG. 2b) the layers 22 form angle $\Theta_1$ with respect to the first substrate and angle $\Theta_2$ respect to the second substrates. At zero field molecules 24 are aligned with their projections in the yz plane at an angle to the z-axis. Upon application of an electric field the spontaneous polarization of the FLC is forced to follow the field and the molecules directors bend toward the z-axis.

In the chevron alignment (FIG. 2c) smectic layers 32 form a chevron shape forming angles $\Theta_1'$ and $\Theta_2'$ with respect to the substrates, and molecules 34 are aligned parallel to each other in one region (upper portion) and splayed in a second region (lower portion). As in the quasi-bookshelf alignment, application of an electric field forces the spontaneous polarization to align with the field and the molecules bend toward the z-direction. In this invention, analog tuning is achieved with analog variation in the magnitude of the electric field rather than by switching the field direction, i.e., without switching the polarity of the field between positive and negative.

The extraordinary refractive index, $n_e$, is oriented along the optic axis of the liquid crystal molecules, which is oriented approximately along the molecular director. In the quasi-bookshelf and the chevron structures, application of an electric field changes the molecular orientation with respect to the xz plane and therefore the projection of $n_e$ in the xz plane changes. Light at normal incidence has its polarization vector in the xz plane and therefore experiences a variable refractive index, which produces analog phase modulation.

The analog phase modulators of the invention comprise a pair of substrates, smectic layers of liquid crystal aligned so that the liquid crystals are not parallel to the cell walls, and a means for applying an electric field perpendicular to the cell walls. They employ a means for aligning the smectic layers. The alignment means can comprise an alignment layer. The alignment layer can be a rubbed polymer coating or obliquely evaporated $SiO_x$. The polymer can be, for example, nylon 66, PVA, PBT, or silane. The rubbed polymer or $SiO_x$ coated substrates are aligned antiparallel to produce the quasi-bookshelf structure or parallel to produce the chevron structure. The substrate itself can be rubbed to promote a quasi-bookshelf or chevron alignment. The liquid crystal can be a SmC* liquid crystal. Smectic A* and distorted helix ferroelectric (DHF) liquid crystals can also be employed in the phase modulators of this invention. In this invention, alignment layers can promote quasi-bookshelf or chevron structures, and the liquid crystal layer thickness can be chosen to be larger than the layers thickness which can be surface stabilized into the bookshelf alignment, i.e. larger than 2–3 μm. Cells of this invention have been fabricated with thicknesses much larger than surface stabilized cells, in the range of 8–25 μm.

The phase modulator of this invention can be used within a Fabry-Perot cavity to provide analog tuning of the refractive index within the cavity. This cannot be achieved with bookshelf aligned smectic liquid crystals. The Fabry-Perot filter (FIG. 3) comprises substrates 10, transparent electrodes 40, reflective means 41, and alignment layers 42, and smectic liquid crystal 43.

Figure 3:
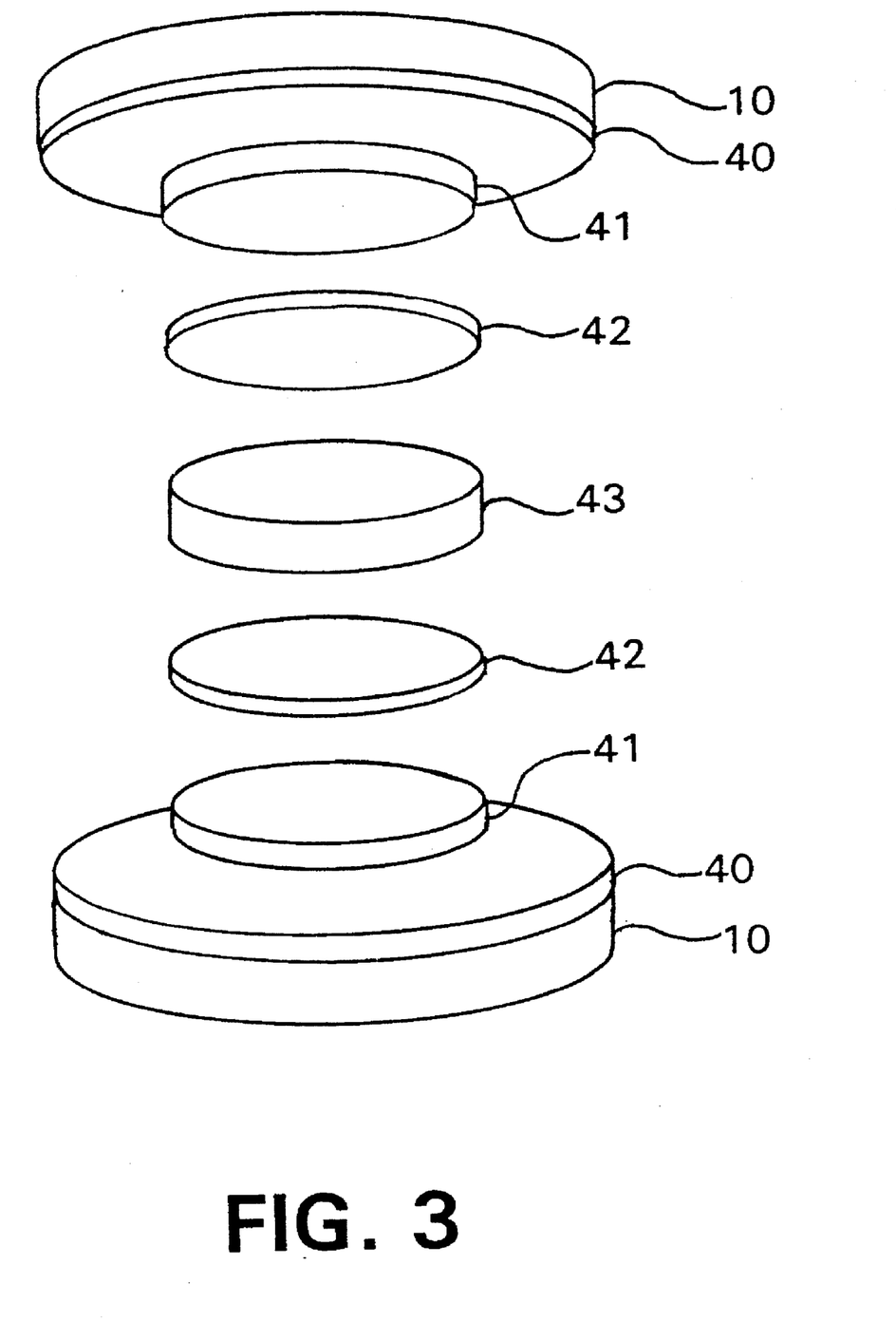
FIG. 3 is a liquid crystal Fabry-Perot filter.

The equations governing the Fabry-Perot resonator can be summarized as follows:

$$T = \frac{(1-R)^2}{(1-R)^2 + 4R\sin^2(\delta/2)} \qquad \text{Eq. 1}$$

where $$\delta = \frac{4\pi n_e(\theta) l \cos\theta_i}{\lambda}, \qquad \text{Eq. 2}$$

R is the reflectivity of the mirrors, $n_e$ is the extraordinary refractive index of liquid crystal, l is the cavity length, $\lambda$ is the operating wavelength, $\theta_i$ is the incident angle, and $\theta$ is the angle between the optical propagation direction and the molecular director inside the cell. At the resonance peaks $\delta = 2m\pi$ and we have transmitted wavelengths $$\lambda_m = \frac{2n_e(\theta) l \cos(\theta_i)}{m}, \qquad \text{Eq. 3}$$

where m=1,2,3 . . . . For normal incidence, $\theta_i=0$ and $$\Delta\lambda = \frac{\lambda}{n_e(\theta)} \Delta n_e. \qquad \text{Eq. 4}$$

Thus, the wavelength can be tuned by changing the index of refraction of the liquid crystal.

Figure 4:
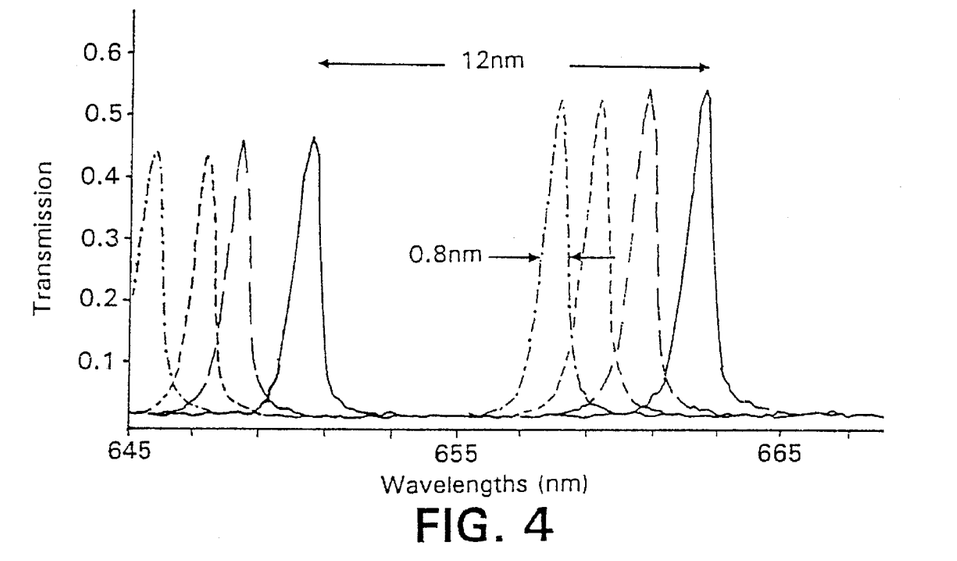
FIG. 4 shows visible transmission spectra of a liquid crystal Fabry-Perot filter as a function of applied electric field.

The wavelength tuning of a Fabry-Perot (FP) filter of this invention is illustrated in FIG. 4. This device comprises optical flats coated with ITO transparent electrodes and dielectric mirrors optimized for reflection in the visible. Parallel aligned, rubbed nylon 66 was the alignment material. FLC Chisso 1014 was filled into the 10 μm FP cavity. After a gradual cool down to room temperature to make the SmC* phase, the FP cell was placed into the path of a collimated white light beam. Various E-fields varying from 0–6 V/μm were then applied to the FP cell. A continuously tunable optical spectrum was obtained as shown in FIG. 4. This shows transmission spectra at four different applied fields, with two transmission peaks visible for each field level. The FSR, the distance between successive transmission peaks, is 12 nm and the FWHM is 0.8 nm. As the electric field is varied, the wavelengths of the transmission peaks vary. The simplicity of the device structure and the small electric field required are clearly demonstrated in this device.

Figure 5:
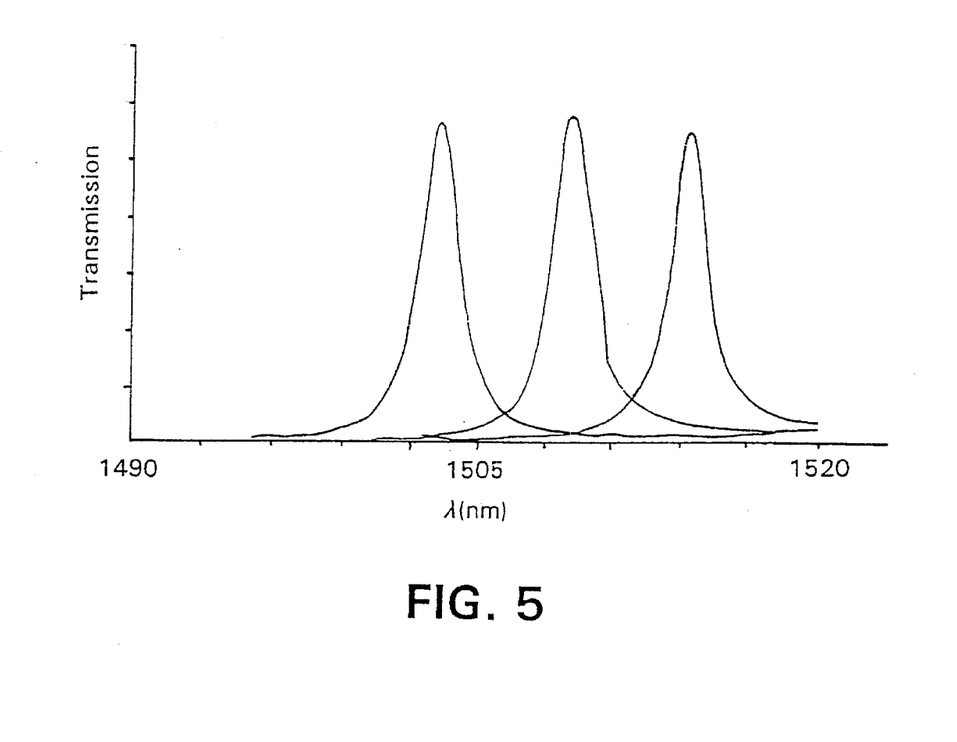
FIG. 5 shows infrared transmission spectra of a liquid crystal Fabry-Perot filter as a function of applied electric field.

The FP filter can also operate in the infrared. FIG. 5 illustrates the tunable transmission of a filter which has the same construction as the filter of FIG. 4 except that the dielectric mirrors are optimized for transmission in the infrared. Variation of the applied electric field varies the transmission wavelength. This wavelength range is particularly suited to fiber optic communications.

Figure 6:
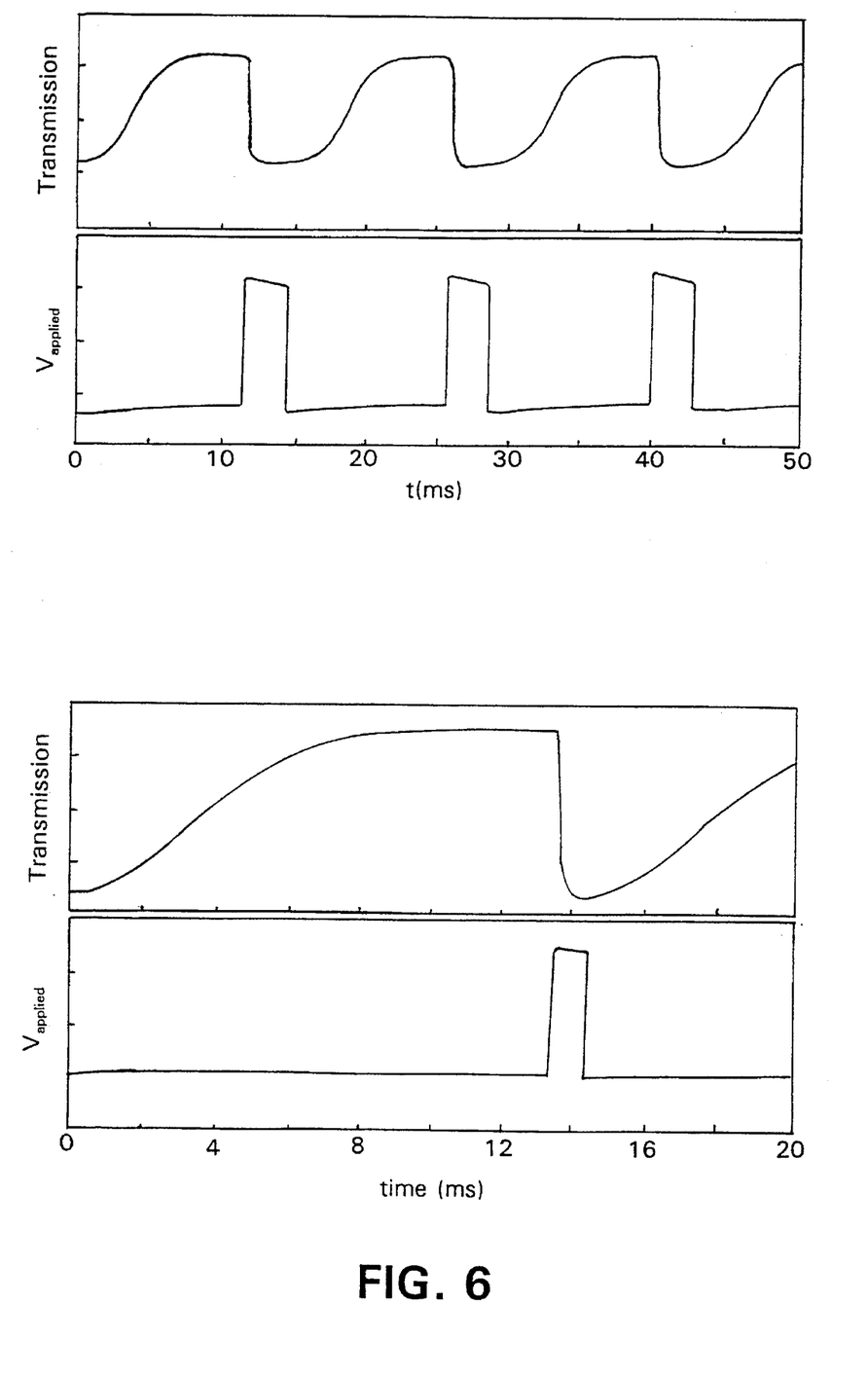
FIG. 6 shows the time response of the transmission of a liquid crystal Fabry-Perot filter at a fixed wavelength as the voltage is switched on and off.

The response time of the device of FIG. 5 is illustrated in FIG. 6. A voltage is applied in a square wave pulse (lower graphs) and the transmission at a fixed wavelength is measured (upper graphs). At zero voltage, the transmission at the monitored wavelength is a maximum. Upon applying a voltage the filter is tuned to a different transmission wavelength and the transmission at the monitored wavelength decreases. The fall time of the transmission is 400 ‖s in the first measurement and 330 µs in the second. Chisso 1014 is a particularly slow response liquid crystal. Faster responses are available from a number of other smectic liquid crystals.

This invention provides analog phase modulators, a method of analog phase modulation and Fabry-Perot filters utilizing analog phase modulators and polarization insensitive Fabry-Perot filters utilizing analog phase modulators. It has been illustrated with SmC* liquid crystal cells. It can also be embodied with other liquid crystal materials such as SmA*, DHF, antiferroelectric and achiral ferroelectric liquid crystals. Alignment with a rubbed polymer alignment layer has been illustrated. Numerous other alignment techniques can be used within the scope of this invention.

The phase modulator used in a Fabry-Perot filter is ideally suited to wavelength division multiplexing in optical communications. Other applications for the phase modulator of this invention include phase modulation of coherent light, for example, laser beam steering, diffractive optical elements, variable focal length lens, and holographic display devices. By using the devices placed in between crossed polarizers at 45° to the optical axis, the device can also perform analog amplitude modulation.

Other embodiments of the phase modulator and other applications of the devices will be readily apparent to those skilled in the art and fall within the scope and spirit of this invention.

We claim:

1. A phase modulator for receiving light and for varying the phase of the light, comprising:

a first and a second cell wall;

a smectic liquid crystal disposed between said cell walls and aligned with smectic layers forming a first oblique angle with said first cell wall and a second oblque angle with said second cell wall; and a first and second electrode positioned between said liquid crystal and said first and second cell walls, respectively, whereby an analog electric field of a single polarity can be applied peerpendicular to said cell walls;

wherein applying said analog electric field tilts the molecular directors of said liquid crystal with respect to the plane of said cell walls, thereby modulating the phase of light exiting said phase modulator in an analog manner.

2. The phase modulator of claim 1 wherein said liquid crystal is aligned in a quasi-bookshelf structure.

3. The phase modulator of claim 11 wherein said liquid crystal is aligned in a chevron structure.

4. The phase modulator of claim 1 wherein said liquid crystal is a SmC* liquid crystal.

5. The phase modulator of claim 1 wherein said liquid crystal is not surface stailized.

6. The phase modulator of claim 1 wherein said liquid crystal is greater than 2µm thick.

7. The phase modulator of claim 1 wherein said liquid crystal is greater than 3 µm thick.

8. The phase modulator of claim 1 wherein said liquid crystal is between 8 and 25 µm thick.

9. The phase modulator of claim 1 wherein said liquid crystal is approximately 10 µm thick.

10. The phase modulator of claim 1 wherein said liquid crystal is selected from the group consisting of SmC*, SmA*, DHF, antiferroelectric, and achiral ferroelectric liquid crystals.

11. The phase modulator of claim 1 further comprising a first and a second alignment layer disposed between said liquid crystal and said first and second cell walls, respectively.

12. The phase modulator of claim 11 wherein said alignment layers comprise a rubbed polymer.

13. The phase modulator of claim 11 wherein said alignment layers comprise obliquely evaporated $SiO_x$.

14. The method of phase modulation of a light beam comprising the steps of:

providing the phase modulator of claim 1;

impinging a light beam on said liquid crystal cell; and applying a voltage to said electrodes to produce an electric field perpendicular to said substrates;.

wherein applying said electric field tilts the molecular directors of said liquid crystal with respect to a plane parallel to said cell walls, thereby modulating the phase of light exiting said liquid crystal cell.

15. A Fabry-Perot etalon modulator comprising the phase modulator of claim 1 and further comprising a first and a second reflector positioned on a first and a second side of said liquid crystal, respectively, to form a resonance cavity.

16. The etalon modulator of claim 15 wherein said liquid crystal is aligned in a quasi-bookshelf structure.

17. The etalon modulator of claim 15 wherein said liquid crystal is aligned in a chevron structure.

18. The etalon modulator of claim 15 wherein said liquid crystal is a SmC* liquid crystal.

19. The etalon modulator of claim 6 wherein said liquid crystal is aligned in a quasi-bookshelf structure.

20. The etalon modulator of claim 6 wherein said liquid crystal ls aligned in a chevron structure.

21. The etalon modulator of claim 15 wherein said liquid crystal is not surface stabilized.

22. The etalon modulator of claim 15 wherein said liquid crystal is greater than 2 µm thick.

23. The etalon modulator of claim 15 wherein said liquid crystal is greater than 3 µm thick.

24. The etalon modulator of claim 15 wherein said liquid crystal is between 8 and 25 µm thick.

25. The etalon modulator of claim 15 wherein said liquid crystal is approximately 0 µm thick.

26. The etalon modulator of claim 15 wherein said liquid crystal is selected from the group consisting of SmC*, SmA*, DHF, antiferroelectric, and achiral ferroelectric liquid crystals.

27. The etalon modulator of claim 15 further comprising a first and a second alignment layer disposed between said liquid crystal and said first and second cell walls, respectively.

28. The etalon modulator of claim 27 wherein said alignment layers comprise a rubbed polymer.

29. The etalon modulator of claim 27 wherein said alignment layers comprise obliquely evaporated $SiO_x$.

30. The etalon modulator of claim 15 wherein the reflectivities of said reflectors are such that a portion of light received on said first reflector is output through said second reflector.

31. A method of phase modulation of a light beam comprising the steps of:

providing a liquid crystal cell comprising a first and a second cell wall, a smectic liquid crystal disposed between said cell walls and aligned with smectic layers forming a first oblique angle with said first cell wall and a second oblique angle with said second cell wall, and a first and a second electrode positioned between said liquid crystal and said first and second cell walls, respectively;

impinging a light beam on said liquid crystal cell; and applying a voltage to said electrodes to produce an electric field perpendicular to said substrates;

wherein applying said electric field tilts the molecular directors of said liquid crystal with respect to a plane parallel to said cell walls, thereby modulating the phase of light exiting said liquid crystal cell.

32. The method of phase modulation of claim 31 wherein said liquid crystal is aligned in a quasi-bookshelf structure.

33. The method of phase modulation of claim 31 wherein said liquid crystal is aligned in a chevron structure.

34. The method of phase modulation of claim 31 wherein said liquid crystal is a SmC* liquid crystal.

35. The method of phase modulation of claim 34 wherein said voltage is applied with a single polarity with amplitude variable in an analog manner.

36. The method of phase modulation of claim 35 wherein the analog electric field produced by said applied voltage tilts said molecular directors in an analog manner and modulates said phase of exiting light in an analog manner.

37. The method of phase modulation of claim 31 wherein said liquid crystal is greater than 2 µm thick.

38. The method of phase modulation of claim 31 wherein said liquid crystal is greater than 3 µm thick.

39. The method of phase modulation of claim 31 wherein said liquid crystal is between 8 and 25 µm thick.

40. The method of phase modulation of claim 31 wherein said liquid crystal is approximately 10 µm thick.

41. The method of phase modulation of claim 31 wherein said liquid crystal is selected from the group consisting of SmC*, SmA*, DHF, antiferroelectric, and achiral ferroelectric liquid crystals.

42. The method of phase modulation of claim 31 wherein said liquid crystal cell further comprises a first and a second alignment layer positioned between said liquid crystal and said first and second cell walls, respectively.

43. The method of phase modulation of claim 42 wherein said alignment layers comprise a rubbed polymer.

44. The method of phase modulation of claim 42 wherein said alignment layers comprise obliquely evaporated $SiO_x$.

* * * * *

UNITED STATES PATENT AND TRADEMARK OFFICE
CERTIFICATE OF CORRECTION

PATENT NO.   : 5,510,914

DATED        : April 23, 1996

INVENTOR(S)  : Jian-Yu Liu et al.

It is certified that error appears in the above-identified patent and that said Letters Patent is hereby corrected as shown below:

On the title page, item [56]:
Under references cited, delete "4,848,663" and replace with --4,838,663--.

Column 2, lines 66-67, delete "FIG. 7 is a liquid crystal polarization insensitive Fabry-Perot filter."

Column 3, line 34, insert --with-- before the word "respect".

Column 3, line 35, delete "substrates" and replace with --substrate--.

Column 4, line 35, delete "1 is the cavity length" and replace with --l is the cavity length--.

Column 5, line 15, delete " ‖s" and replace with --$\mu$s--.

Column 5, lines 20-21, delete "and polarization insensitive Fabry-Perot filters utilizing analog phase modulators."

Column 5, line 47, (claim 1) delete "oblque" and replace with --oblique--.

Column 5, line 60, (claim 3) delete "11" and replace with --1--.

Column 5, line 65, (claim 5) delete "stailized" and replace with --stabilized--.

Column 6, line 38, (claim 19) delete "6" and replace with --18--.

Column 6, line 40, (claim 20) delete "6" and replace with --18--.

Column 6, line 41, (claim 20) delete "Is" and replace with --is--.

UNITED STATES PATENT AND TRADEMARK OFFICE
CERTIFICATE OF CORRECTION

PATENT NO.  : 5,510,914
DATED       : April 23, 1996
INVENTOR(S) : Jian-Yu Liu, et al.

It is certified that error appears in the above-indentified patent and that said Letters Patent is hereby corrected as shown below:

Column 6, line 51, (claim 25) delete "0" and replace with --10--.

Signed and Sealed this

Sixteenth Day of July, 1996

*Attest:*

BRUCE LEHMAN

*Attesting Officer*    *Commissioner of Patents and Trademarks*